May 31, 1949.  E. F. WICHOREK  2,472,031
PUMP WITH PRESSURE LOADED STEPPED BUSHING
Filed July 31, 1946
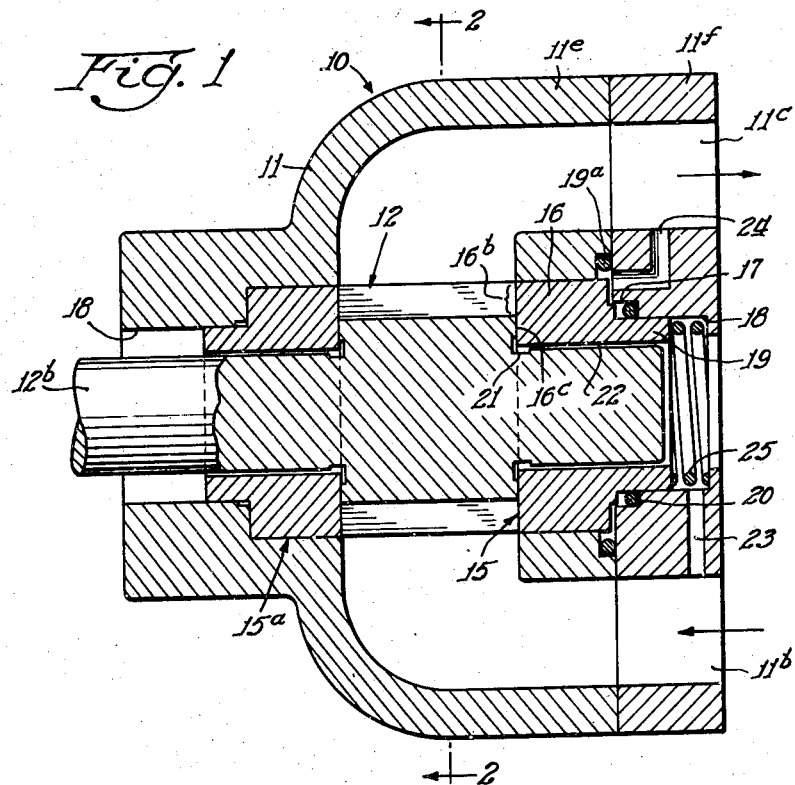
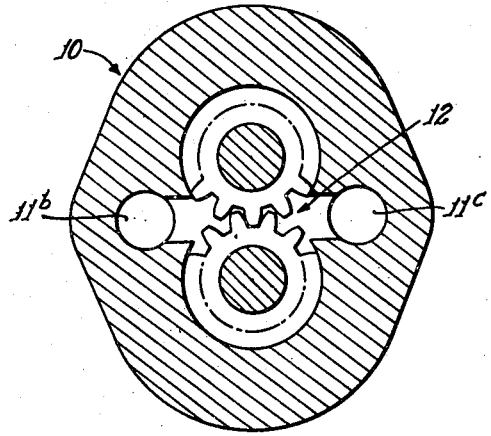
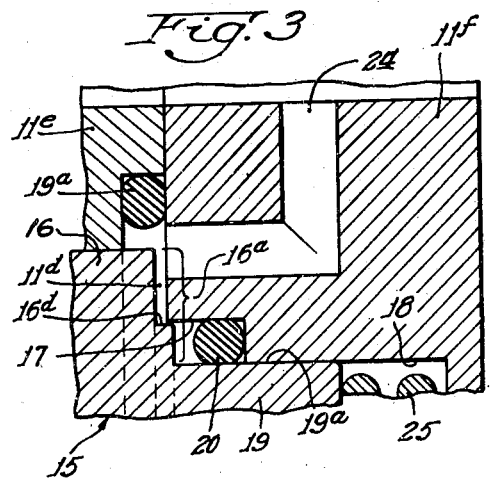
Inventor:
Edmund F. Wichorek Patented May 31, 1949

2,472,031

UNITED STATES PATENT OFFICE 2,472,031

PUMP WITH PRESSURE LOADED STEPPED BUSHING

Edmund F. Wichorek, Euclid, Ohio, assignor to Borg-Warner Corporation, Chicago, Ill., a corporation of Illinois Application July 31, 1946, Serial No. 687,379

4 Claims. (Cl. 103—126)

This invention relates to pressure loaded fluid displacement devices, and particularly to gear pumps wherein an auxiliary bushing is held against the side face of the corresponding toothed gear member by a very finely unbalanced portion of the fluid pressure generated by the pump and acting in the direction to maintain a pumping seal between the bushing and gear side face.

In pumps of the present type, having a very small displacement of the order of .072 cubic inch the problem of providing the necessary pressure responsive area on the outside radial face of the bushing has been encountered, the difficulty being evidenced by distortion of the tubular extension and by binding between this extension and the gear journal. This difficulty has been found to result from the unavoidably small radial thickness of the axially extending tubular portion of the bushing, where the annular groove for the reception of the seal ring is formed in this tubular extension as illustrated in earlier Lauck application Serial No. 439,030 filed April 15, 1942 now Patent No. 2,420,622, the present invention being an improvement over that shown in this earlier case.

It is an object of this invention to provide in a fluid displacement device such as in a pressure loaded pump of the type illustrated, an improved bushing, housing and seal relationship.

It is a more specific object to provide in a pressure loaded pump of the present type including a pressure loaded bushing having a tubular extension received in a complementary reduced bore in the pump housing, an improved construction of housing, bore and bushing resulting in a maximum pressure responsive area on the bushing acting in the direction of sealing engagement with a minimum permissible radial thickness of tubular bushing portion, this portion having an uninterrupted external surface.

Additional objects, advantages and uses of my invention will become apparent from a reading of the following specification taken in connection with the appended drawing which forms a part thereof and wherein:

Fig. 1 is a schematic axial cross-sectional view bringing out to advantage the relationship of the new bushing and bore structure, and the mode of coaction of the O-ring seal;

Fig. 2 is a cross-sectional view taken substantially on the line 2—2 of Fig. 1; and Fig. 3 shows an enlarged broken away sectional view of Fig. 1 bringing out to advantage the critical structural relation to which the present invention is particularly directed.

Referring in greater detail to the figures of the drawing there is illustrated by way of preferred example a gear pump 10 comprising essentially a housing 11 containing rotary fluid displacement means in the form of intermeshing gears indicated generally at 12.

Liquid seal with the side faces of the gears is effected by means of a special form of bearing bushing and sealing end plate indicated generally at 15 together with a special construction of the complementary portion of the housing, this being the subject matter to which the present invention is particularly directed.

This bearing, bushing and sealing end plate comprises a radially extending flange portion 16 the outer radially extending surface portion 16a comprising a liquid pressure responsive surface and forming with the housing wall a pressure chamber 11d, surface 16a functioning to hold the inner radially extending surface 16c in liquid sealing engagement with the side face of the corresponding gear. Radial surface portion 16b is subject to the pressure existing between the teeth of the gear members 12 acting in direct opposition to the pressure liquid in contact with the opposed surface 16a. It is the required fine degree of over balance of bushing 15 in the direction of sealing engagement that presents the difficult problem solved by the novel arrangement presented in this case. Where the device 10 is to function as a pump of the type having a small displacement of the order of .072 cubic inch it has been found extremely difficult to provide the inner surface 16c with sufficient area to maintain a seal radially inwardly of the roots of the teeth and at the same time to provide a pressure responsive surface 16a having sufficient area to give the necessary over balance in the direction of the sealing engagement.

It was found that in the bushing seal and plate construction disclosed in the above referred to copending application, that the provision of the annular groove in the axially extending tubular portion resulted in the pressure responsive surface corresponding to 16a being insufficient. When an effort was made to increase this area there resulted a tubular extension of such reduced radial thickness that the same became distorted into binding engagement with the journal with the resultant failure of the pump.

This problem has been solved by the provision of a counter bore or step 17 in the inner terminal of reduced housing bore 18. Tubular extension 19 having an uninterrupted external surface 19a results in the tubular extension 19 being much stronger than where the same contains an annular groove for the O-sealing ring 20. With this arrangement it is readily apparent that the effectiveness of pressure responsive surface 16a extends radially inwardly to the uninterrupted external surface of the tubular portion 19, while in the earlier form the effective area was reduced by an amount corresponding to the radial thickness of the O-ring seal 20.

In addition to the above there is provided a step 16d complementary in diameter to the step 17 in bore 18, received in telescoping relation thereto and functioning to provide an effective closure preventing the extrusion of the seal member 20.

The relief recess 21 is formed in the gear member radially inwardly of the roots of the teeth in communication with the radial inner portion of sealing surface 16c and this relief recess is placed in communication with the inlet 11b through passages 22 and 23. Pump discharge pressure is delivered to pressure chamber 11d by passage 24. A plain bushing and sealing end plate 15a is preferably employed on the opposite side of the gear members and is received in a similar bore 18. The pump housing 11 is preferably formed in the two sections 11e and 11f, held together in the usual manner (not shown) and including a second O sealing ring 19a therebetween. Coil compression spring 25 functions to maintain an initial seal. One of the journal extensions 12b is provided in a conventional manner with means (not shown), for placing the same in driving relationship with a source of power such as an internal combustion engine.

While I have disclosed my invention in connection with a specific embodiment thereof, it will be understood that this is by way of example rather than limitation and that the scope of my invention is to be determined by the appended claims.

I claim:

1. In a pressure loaded rotary liquid displacement device of the type, including a housing, rotary liquid displacement means received within said housing; means defining an axially adjustable bushing having a radially extending flange formed with a pressure responsive surface for effecting a liquid seal engagement with said rotary liquid displacement means, said bushing being further formed with a reduced axial tubular extension received in a corresponding reduced bore in said housing said tubular portion having an uninterrupted external surface, an O-ring seal member positioned between said tubular extension and said housing bore; said arrangement being particularly characterized by the formation of an enlarged step in the inner open terminal of said reduced bore for the reception of said seal ring, said tubular extension being embraced by said step, said O-ring seal being located within said enlarged step in sealing contact with the outer surface of said reduced tubular extension; and means for directing pressure liquid to said pressure responsive surface.

2. The arrangement defined in claim 1 wherein said bushing is further particularized by having a step thereon complementary to said housing step and receivable in telescoping relation thereto functioning to confine said O-ring seal.

3. In a pressure loaded rotary liquid displacement device of the type, including a housing formed with a chamber therein, intermeshing toothed gear members received within said housing and having journals extending from the sides thereof; means defining bearing bushing and sealing end plate members received about said journals on at least one side of said gear members, said means including a first inner radially extending gear side face engaging surface, an outer liquid pressure responsive surface for causing liquid seal engagement between said gear side face and said first named face; said bushing and sealing end plate being further characterized by the inclusion of an axially extending reduced tubular portion having an uninterrupted external surface; reduced bores formed in said housing for the reception of said journals and tubular portions; counterbores formed in the inner open terminals of said reduced bores and surrounding said tubular extension; an O-ring seal positioned within said counterbore in engagement with said uninterrupted external surface of said tubular extension; a step formed on said bushing complementary to said counterbore and received therein in telescoping relation, and functioning to confine said O-ring seal in position.

4. A pump comprising: a housing containing a pair of adjoining substantially cylindrical chambers having radial end walls, said housing also having an inlet leading to and an outlet leading from said chambers; a toothed gear member in each of said housing chambers, said gear members meshing at the juncture of said housing chambers; reduced bores in the end walls of said housing chambers forming reduced extensions of said housing chambers, counterbores in the inner open ends of said first named reduced bores on at least one side of said gear members, said gear members having journals extending from the opposite sides thereof into said reduced bores; means defining bearing bushings and sealing end plates in said housing on at least one side of said gear members, said bushings including tubular portions having uninterrupted external surfaces surrounding said journals, and received in said reduced bores on at least one side of said gear members with said counterbore portions embracing said tubular portions and substantially annular plate-like portions at the inner terminals of said tubular portions received in said housing chambers, said annular portions each having a front face engageable with the adjacent side face of its associated gear member, said front face and said side face constituting a pair of adjacent faces which provide a sealing area between said front face and gear member during pumping, a portion of said front faces being subject to the pressure in said housing chamber between said teeth, each of said plate-like portions having a back face normally spaced from the adjacent end wall of its associated housing chamber and providing an annular pressure chamber at the back face of each of said plate-like portions; ring-like seal members disposed in each of said counterbores and contacting said uninterrupted external surface of said tubular portions in pressure sealing relation between said bores and said tubular portions; means establishing communication between said outlet and said pressure chamber at the back face of said plate-like portions whereby to subject said back faces to the pressure developed in said outlet by said gear members; means defining a relief recess disposed inwardly of the roots of the gear teeth, and communicating with the radial inner portions of said area providing the sealing faces, and means establishing communication between said relief recess and a zone under less pressure than in said outlet.

EDMUND F. WICHOREK.

REFERENCES CITED

The following references are of record in the file of this patent:

UNITED STATES PATENTS

| Number | Name | Date |
| --- | --- | --- |
| Re. 22,116 | Janette | June 16, 1942 |
| 2,412,588 | Lauck | Dec. 17, 1946 |